United States Patent
Dong

(10) Patent No.: US 12,439,309 B2
(45) Date of Patent: Oct. 7, 2025

(54) METHODS FOR PROCESSING HANDOVER PARAMETERS, AND TERMINAL

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 441 days.

(21) Appl. No.: 18/012,171

(22) PCT Filed: Aug. 5, 2020

(86) PCT No.: PCT/CN2020/107133
§ 371 (c)(1),
(2) Date: Dec. 21, 2022

(87) PCT Pub. No.: WO2022/027322
PCT Pub. Date: Feb. 10, 2022

(65) Prior Publication Data
US 2023/0262550 A1    Aug. 17, 2023

(51) Int. Cl.
*H04W 4/00* (2018.01)
*H04W 36/00* (2009.01)
*H04W 36/32* (2009.01)
*H04W 76/20* (2018.01)

(52) U.S. Cl.
CPC ..... *H04W 36/0094* (2013.01); *H04W 36/322* (2023.05); *H04W 76/20* (2018.02)

(58) Field of Classification Search
CPC ........... H04W 36/0094; H04W 36/322; H04W 76/20; H04W 36/32; H04W 36/0009; H04W 84/06

USPC ......................................................... 370/331
See application file for complete search history.

(56) References Cited

U.S. PATENT DOCUMENTS

| | | | | |
|---|---|---|---|---|
| 6,154,652 A * | 11/2000 | Park | ................. | H04W 36/0094 370/347 |
| 8,467,351 B2 * | 6/2013 | Liu | .................... | H04W 36/0094 370/332 |
| 8,588,781 B2 * | 11/2013 | Belschner | ....... | H04W 36/00837 455/437 |

(Continued)

FOREIGN PATENT DOCUMENTS

| | | |
|---|---|---|
| CN | 105228192 A | 1/2016 |
| CN | 108271228 A | 7/2018 |
| EP | 2693829 A1 | 2/2014 |

OTHER PUBLICATIONS

European Patent Application No. 20948552.3, Search and Opinion dated Mar. 26, 2024, 13 pages.

(Continued)

*Primary Examiner* — Amancio Gonzalez
(74) *Attorney, Agent, or Firm* — Cozen O'Connor

(57) ABSTRACT

A method for processing handover parameters is performed by a network device. The method comprises: determining a handover parameter set, wherein the handover parameter set comprises at least one group of handover parameters, and each group of handover parameters among the at least one group of handover parameters corresponds to one target cell among at least one target cell; and sending first information for indicating the handover parameter set to a terminal.

18 Claims, 4 Drawing Sheets determining a handover parameter set, in which the handover parameter set at least includes at least one group of handover parameters, each group of handover parameters in the at least one group of handover parameters corresponding to one target cell of at least one target cell.    S210

(56) References Cited

U.S. PATENT DOCUMENTS

| | | | |
|---|---|---|---|
| 8,660,092 B2* | 2/2014 | Jeon | H04W 36/00837 370/332 |
| 8,891,490 B2* | 11/2014 | Choi-Grogan | H04W 36/0016 370/332 |
| 8,902,850 B2* | 12/2014 | Choi-Grogan | H04W 36/0044 455/436 |
| 9,191,869 B2* | 11/2015 | Marcum | H04W 36/00837 |
| 9,326,213 B2* | 4/2016 | Catovic | H04W 36/0079 |
| 9,392,513 B2* | 7/2016 | Huang | H04W 28/0861 |
| 9,491,672 B2* | 11/2016 | Prakash | H04W 76/27 |
| 9,532,241 B2* | 12/2016 | Koskinen | H04W 76/28 |
| 9,578,561 B2* | 2/2017 | Kapoulas | H04W 64/006 |
| 9,585,076 B2* | 2/2017 | Liu | H04W 36/0085 |
| 9,635,627 B2* | 4/2017 | Krishnamoorthy | H04L 5/0044 |
| 9,674,740 B2* | 6/2017 | Masini | H04W 36/0085 |
| 10,425,874 B2* | 9/2019 | Eriksson | H04W 24/10 |
| 10,530,639 B2* | 1/2020 | Dudda | H04W 36/0055 |
| 10,681,605 B2* | 6/2020 | Dimou | H04W 36/0011 |
| 10,757,615 B2* | 8/2020 | Park | H04W 76/19 |
| 10,772,018 B2* | 9/2020 | Yeh | H04W 36/08 |
| 10,945,171 B2* | 3/2021 | Kalathil | H04W 64/006 |
| 10,945,184 B2* | 3/2021 | Cha | H04W 36/305 |
| 11,005,704 B2* | 5/2021 | Dudda | H04W 24/10 |
| 11,006,337 B2* | 5/2021 | Vaidya | H04W 36/26 |
| 11,019,547 B1* | 5/2021 | Oroskar | H04W 36/0088 |
| 11,115,884 B1* | 9/2021 | Kim | H04B 7/0413 |
| 11,323,922 B2* | 5/2022 | Zetterlund | H04W 36/26 |
| 11,974,327 B2* | 4/2024 | Park | H04W 74/0833 |
| 12,035,181 B2* | 7/2024 | Chang | H04W 36/0072 |
| 12,207,076 B2* | 1/2025 | Ramachandra | H04W 36/305 |
| 2008/0076429 A1* | 3/2008 | Comstock | H04W 36/18 455/442 |
| 2010/0184439 A1* | 7/2010 | Chen | H04W 36/0061 455/436 |
| 2013/0176853 A1* | 7/2013 | Mahr | H04W 36/0085 370/236 |
| 2015/0245259 A1* | 8/2015 | Marcum | H04W 36/00837 455/437 |
| 2016/0014592 A1* | 1/2016 | Park | H04W 16/18 370/331 |
| 2019/0014513 A1 | 1/2019 | Yang et al. | |
| 2019/0045406 A1* | 2/2019 | Kalathil | H04W 36/0094 |
| 2021/0176688 A1* | 6/2021 | Stauffer | H04W 36/0077 |
| 2021/0377833 A1* | 12/2021 | Yang | H04W 36/1443 |
| 2022/0124566 A1* | 4/2022 | Wallentin | H04W 36/0094 |
| 2022/0279585 A1* | 9/2022 | Jang | H04W 74/0833 |
| 2022/0394562 A1* | 12/2022 | Wang | H04W 36/32 |
| 2023/0040285 A1* | 2/2023 | Parichehrehteroujeni | H04W 36/0079 |

OTHER PUBLICATIONS

PCT/CN2020/107133 English translation of International Search Report dated Apr. 26, 2021, 2 pages.

* cited by examiner

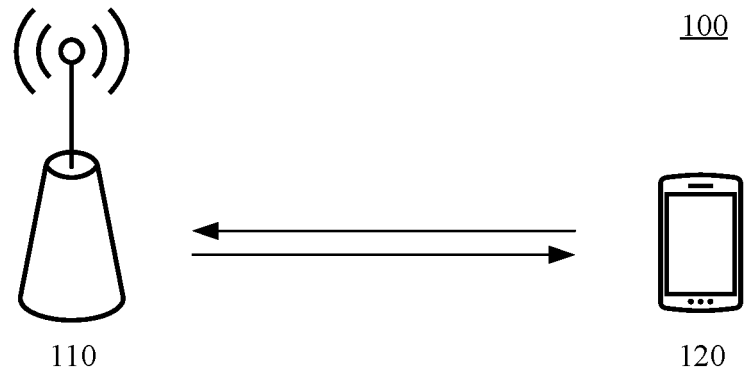

FIG. 1

| determining a handover parameter set, in which the handover parameter set at least includes at least one group of handover parameters, each group of handover parameters in the at least one group of handover parameters corresponding to one target cell of at least one target cell. | S210 |

FIG. 2

| acquiring a handover parameter set, in which the handover parameter set at least includes at least one group of handover parameters, each group of handover parameters in the at least one group of handover parameters correspondingly corresponding to one target cell of at least one target cell | S310 |

FIG. 3

METHODS FOR PROCESSING HANDOVER PARAMETERS, AND TERMINAL

CROSS-REFERENCE TO RELATED APPLICATION

This application is the U.S. national application of International Application No. PCT/CN2020/107133, filed on Aug. 5, 2020, the entire disclosure of which are incorporated herein by reference for all purposes.

TECHNICAL FIELD

The present disclosure relates to a field of wireless communication technologies, and particularly to a method and an apparatus for processing handover parameters, and a storage medium.

BACKGROUND

Non-terrestrial networks (NTN) have been introduced in the Fifth Generation (5G) of wireless communications networks, also known as New Radio (NR). Due to a large cell radius of the NTN, a cell may serve a large number of users. Due to the movement of a satellite, user terminals inevitably need to perform handover operations. That is, in a period of time, the large number of user terminals may be performing handover operations simultaneously. A handover command is configured by a source cell through a radio resource control (RRC) signaling to a user equipment (UE), and the handover command includes some configurations of a target cell. Therefore, handover of the large number of users in a short time results in a large number of signaling overheads and challenges for service continuity.

SUMMARY

According to a first aspect of the present disclosure, a method for processing handover parameters is performed by a network device. The method includes:
determining a handover parameter set, in which the handover parameter set includes at least one group of handover parameters, each group of handover parameters in the at least one group of handover parameters corresponding to one target cell of at least one target cell; and sending first information for indicating the handover parameter set to a terminal.

According to a second aspect of the present disclosure, a method for processing handover parameters is performed by a terminal. The method includes:
acquiring a handover parameter set according to first information sent by a network device, in which the handover parameter set includes at least one group of handover parameters, each group of handover parameters in the at least one group of handover parameters corresponding to one target cell of at least one target cell.

According to a third aspect of the present disclosure, a terminal includes: a processor; and a memory configured to store instructions executable by the processor; in which, the processor is configured to perform the method for processing handover parameters in the second aspect or any one of the second aspect. The method includes: acquiring a handover parameter set according to first information sent by a network device, in which the handover parameter set includes at least one group of handover parameters, each group of handover parameters in the at least one group of handover parameters corresponding to one target cell of at least one target cell.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 1 is a diagram illustrating a wireless communication system according to an embodiment.

FIG. 2 is a flowchart illustrating a method for processing handover parameters by a network device, according to an embodiment.

FIG. 3 is a flowchart illustrating a method for processing handover parameters by a terminal, according to an embodiment.

DETAILED DESCRIPTION

Figure 4:
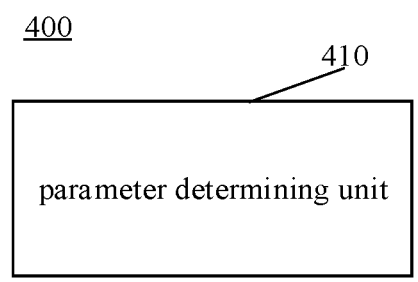
FIG. 4 is a block diagram illustrating a network device apparatus for processing handover parameters according to an embodiment.

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following embodiments do not represent all implementations consistent with the present disclosure. Rather, they are merely examples of apparatuses and methods consistent with some aspects of the disclosure as detailed in the appended claims.

The method for processing handover parameters according to the embodiments of the present disclosure may be applied to a wireless communication system as illustrated in FIG. 1. As illustrated in FIG. 1, the wireless communication system 100 includes a network device 110 and a terminal 120. The network device 110 and the terminal 120 send and receive information through wireless resources.

It may be understood that, the wireless communication system as illustrated in FIG. 1 is only exemplary. The wireless communication system may further include other network devices, for example, a core network device, a wireless relay device and a wireless backhaul device not shown in FIG. 1. The number of network devices and the number of terminals included in the wireless communication system are not limited in embodiments of the present disclosure.

It may be further understood that, the wireless communication system in the embodiments of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance (CSMA/CA). The network may be divided into a 2G (generation) network, a 3G network, a 4G network, or any future generation evolution network (for example, a 5G network and any subsequent generation network) based on capacities, rates, latencies and other factors of different networks. The 5G network may also be referred to as 5G new radio (NR). For ease of description, a wireless communication network is simply referred to as the network in the disclosure sometimes.

Further, the network device involved in the present disclosure may also be referred to as a wireless access network device. The wireless access network device may be a base station, an evolved NodeB (eNodeB or eNB), a home base station, an access point (AP) in a wireless fidelity (WiFi) system, a wireless relay node, a wireless backhaul node, a transmission point (TP), or a transmission and reception point (TRP), etc., or a base station (gNodeB or gNB) in an NR system, or may further be a component or a part of devices constituting a base station. It should be understood that, a specific technology and a specific device form adopted by the network device are not limited in the embodiments of the present disclosure. In the present disclosure, the network device may provide communication coverage for a specific geographic area, and may communicate with a terminal located within the coverage area (cell). In addition, the network device may further be a vehicle-mounted (on-board) device in an Internet of Vehicles (V2X) communication system.

Further, the terminal involved in the present disclosure may further be referred to as a terminal device, a user equipment (UE), a mobile station (MS), a mobile terminal (MT), etc., which is a device that provides voice and/or data connectivity to a user. For example, the terminal may be a handheld device or a vehicle-mounted device with a wireless connection function, etc. At present, the example of some terminals includes, for example, a mobile phone, a pocket personal computer (PPC), a palm computer, a personal digital assistant (PDA), a notebook computer, a tablet computer, a wearable device, or a vehicle-mounted device. In addition, the terminal device may further be a vehicle-mounted device in the Internet of Vehicles (V2X) communication system. It should be understood that, the specific technology and the specific device form adopted by the terminal are not limited in the embodiments of the present disclosure.

The NTN is introduced in the 5G NR. The NTN refers to a 5G satellite communication network, having a feature of a large cell radius. For a low earth orbit (LEO) satellite and a medium earth orbit (MEO) satellite, the cell coverage radius may be 100 km-1000 km. For a geosynchronous/geostationary earth orbit (GEO) satellite, the cell coverage radius may be up to several kilometers. Therefore, a cell in the NTN may serve a large number of users. However, due to the movement of the satellite, the users inevitably need to perform handover. In a period of time, the large number of users need to perform handover simultaneously, as illustrated in Table 1. A maximum value of the number of connection users supported by a current cell-radio network temporary identity (C-RNTI) is 65519. Assume that one cell has 65519 users, an average handover rate of different cell sizes is listed in the below Table 1.

TABLE 1

| Cell diameter (km) | Cell area (km2) | Average UE density (UE/km2) | Satellite speed (km/s) | Time for handover of all UEs in a Cell (s) | Average "handover out" rate (UE s/s) | Average handover rate (in + out) (UE s/s) |
|---|---|---|---|---|---|---|
| 50 | 1964 | 33.36 | 7.56 | 6.61 | 9912 | 19824 |
| 100 | 7854 | 8.34 | | 13.23 | 4952 | 9904 |
| 250 | 49087 | 1.33 | | 33.07 | 1981 | 3962 |
| 500 | 196000 | 0.33 | | 66.14 | 991 | 1982 |
| 1000 | 785000 | 0.08 | | 132.28 | 495 | 990 |

In terrestrial networks (TN), a handover command is configured by a source cell to a UE through an RRC signaling when the UE performs the handover, the handover command including some configurations of an only target cell. When the same handover method is adopted in the NTN, due to handover of a large number of users in a short time, it may cause that a large number of signaling overheads are generated and challenges for service continuity are proposed.

It should be noted that, since the satellite path is relatively fixed and a number of neighbor cells in different directions is small, it may be considered that the handover parameters include handover parameter configurations of at least one target cell, and the above configurations may be pre-configured to the UE. The pre-configuration refers to that the handover parameters are configured to the UE before the UE performs the handover. Since the handover parameters include at least one group of handover parameters, and each group of handover parameters in at least one group of handover parameters corresponds to one target cell of at least one target cell, the handover parameters may be pre-configured to the UE. This avoids generation of a large number of handover commands in a short time and a large number of signaling overheads, and ensures the service continuity.

A method for processing handover parameters is provided in embodiments of the present disclosure, which is performed by a network device. FIG. 2 is a flowchart illustrating a method for processing handover parameters according to an embodiment. As illustrated in FIG. 2, the method for processing the handover parameters is performed by the network device, and includes the following step S210.

At S210, a handover parameter set is determined. The handover parameter set at least includes at least one group of handover parameters, and each group of handover parameters in the at least one group of handover parameters corresponding to one target cell of at least one target cell.

In some embodiments of the present disclosure, the handover parameter set at least includes one group of handover parameters. In another embodiments of the present disclosure, the handover parameter set at least includes a plurality of groups of handover parameters. The plurality of groups of handover parameters refer to two groups or more than two groups of handover parameters.

In the embodiments of the present disclosure, since the handover parameters include at least one group of handover parameters, and each group of handover parameters in at least one group of handover parameters corresponds to one target cell of at least one target cell, the handover parameters may be pre-configured to the UE. It can be understood that the handover parameters include at least one group of handover parameters, and each group of handover parameters corresponds to one or more target cells. This avoids generation of a large number of handover commands in a short time and a large number of signaling overheads, and ensures the service continuity.

In some embodiments of the present disclosure, the handover parameter set includes handover parameters corresponding to all the target cells. In an alternative embodiment, the handover parameter set includes handover parameters corresponding to a part of target cells. In the context of the present disclosure, for example, the target cell refers to a neighbor cell of a service cell of the UE, and all the neighbor cells may be the target cells of the UE. In other words, any neighbor cell of a service cell of the UE may be the target cell of the UE.

In some embodiments of the present disclosure, the same handover parameter set may be applied to all the UEs in a cell, or different handover parameter sets may be applied to different UEs in a cell. In some embodiments of the present disclosure, same handover parameters in the same handover parameter set may be applied to all the UEs in a cell, that is, the same handover parameters may be adopted for each UE in the same target cell. In some embodiments of the present disclosure, different handover parameter sets in the same handover parameter set may be applied to all the UEs in a cell, that is, the different handover parameters may be adopted for each UE in the same target cell.

In the embodiments of the present disclosure, the handover parameter set may be determined and/or updated in any of the following ways:

The handover parameter set may be sent by the network device to the UE; or the network device may send parameter values of at least one handover parameter set to the UE; or the network device may determine at least one handover parameter set from a plurality of candidate handover parameter sets, and send an identifier corresponding to each of the at least one handover parameter set to the UE, so that the UE determines at least one handover parameter set from the corresponding plurality of handover parameter sets; or the network device may determine one or more handover parameters from the plurality of candidate handover parameters to form one or more handover parameter sets, and sends the one or more identifiers corresponding to the handover parameters to the UE, so that the UE determines one or more handover parameters from the corresponding handover parameters to form a handover parameter set. In some embodiments, first information for indicating the handover parameter set may be sent by the network device to the UE. The first information may include at least one of: the handover parameter set; parameter values of the at least one group of handover parameters; an identifier corresponding to the handover parameter set; or one or more identifiers corresponding to the handover parameters in the handover parameter set.

The handover parameter set may be determined by a plurality of candidate handover parameter sets and/or a plurality of handover parameters given in a communication protocol; for example, the UE may determine which candidate handover parameter sets and/or which handover parameters are adopted based on current parameters. In some embodiments, the current parameters may be any one of a location, a cell identity (ID), a base station ID, or a channel state.

The handover parameter sets and/or the handover parameters may be jointly determined by two or more parameters sent by the base station.

The handover parameter sets and/or the handover parameters may be pre-stored in the base station and/or the terminal, so that the terminal may determine handover parameter sets and/or handover parameters used based on the current parameters. In embodiments of the present disclosure, different handover parameters refer to that the handover parameters are not completely same or completely different.

A setting mode of handover parameters in the handover parameter set according to embodiments of the present disclosure is described below.

In some embodiments of the present disclosure, at least one group of handover parameters in the handover parameter set includes location information configured to identify a target cell and handover parameters corresponding to the target cell; or, the at least one group of handover parameters in the handover parameter set includes identity information configured to identify a target cell and handover parameters corresponding to the target cell; or, each group of handover parameters in the handover parameter set includes type information configured to identify a target cell and handover parameters corresponding to the target cell. In some embodiments, the location information configured to identify a target cell can be understood as location information of the target cell, and the location information of the target cell can identify the target cell. That is, different location information corresponds to different target cells. In some embodiments, the identity information configured to identify a target cell can be understood as identity information of the target cell. That is, different identity information corresponds to different target cells. In some embodiments, the type information configured to identify a target cell can be understood as type information of the target cell, and the type information of the target cell can identify the target cell. That is, different type information corresponds to different target cells.

In some embodiments of the present disclosure, the type information of the target cell is configured to indicate whether the target cell is a ground cell or a non-ground cell. The type information of the target cell includes a ground cell, or a non-ground cell. In the present disclosure, for example, the ground cell refers to a cell based on the TN, and the non-ground cell may be a cell based on the NTN. For example, the non-ground cell may include a cell based on the LEO, a cell based on the MEO and a cell based on the GEO. In some embodiments, the type information of the target cell includes a ground cell, a cell based on the LEO, a cell based on the MEO or a cell based on the GEO.

In an embodiment, the at least one group of handover parameters in handover parameter set includes the location information configured to identify a target cell and handover parameters corresponding to the target cell. That is, the at least one group of handover parameters in the handover parameter set includes the location information associated with the target cell, in which different location information corresponds to a different handover parameter. In this case, as an example, the at least one group of handover parameters includes location information 1, a handover parameter 1;

location information 2, a handover parameter 2; ... location information n, a handover parameter n, in which, n is a natural number greater than or equal to 2, and the handover parameter n is a handover parameter of the target cell corresponding to the location information n.

In an embodiment, the at least one group of handover parameters in the handover parameter set includes the identity information configured to identify the target cell and handover parameters corresponding to the target cell. That is, the at least one group of handover parameters in the handover parameter set includes identity (ID) information associated with the target cell, in which different ID information corresponds to a different handover parameter. In this case, as an example, the at least one group of handover parameters includes a cell ID 1, a handover parameter 1; a cell ID 2, a handover parameter 2; ... a cell ID n, a handover parameter n, in which, n is a natural number greater than or equal to 2, and the handover parameter n is a handover parameter of the target cell corresponding to the cell ID n.

In an embodiment, each group of handover parameters in the handover parameter set includes the type information configured to identify the target cell and handover parameters corresponding to the target cell. That is, the at least one group of handover parameters in the handover parameter set includes network type information associated with the target cell, in which different network type information corresponding to a different handover parameter. In this case, as an example, the at least one group of handover parameters includes network type information 1, a handover parameter 1; network type information 2, a handover parameter 2; ... network type information n, a handover parameter n, in which, n is a natural number greater than or equal to 2, and the handover parameter n is a handover parameter of the target cell corresponding to the network type information n.

As an example, the at least one group of handover parameters includes a TN (i.e., network type information 1), a handover parameter 1; a LEO, a handover parameter 2; an MEO (i.e., network type information 2), a handover parameter 3; and a GEO (i.e., network type information 3), a handover parameter 4. For example, each group of handover parameters includes a timer T304. In a handover process, the UE may start the timer T304 when receiving a reconfiguration message for handover. When the UE is unable to complete random access of a target cell before the timer T304 expires, reconstruction having a reason value being handover failure is initiated. Transmission latencies are not same for different network types. Therefore, different durations of the timers T304 are set. For example, a duration of the timer T304 included in the handover parameter 1 for the TN, a duration of the timer T304 included in the handover parameter 2 for the LEO, a duration of the timer T304 included in the handover parameter 3 for the MEO and a duration of the timer T304 included in the handover parameter 4 for the GEO, are set in an ascending order.

A sending mode of the handover parameter set according to the embodiments of the present disclosure is described below.

In some embodiments of the present disclosure, the method for processing the handover parameters includes at least one of: sending the handover parameter set through an MSG4 or an MSGB in a random access process; sending the handover parameter set through a reconfiguration message of a radio resource control (RRC) signaling; or sending the handover parameter set through a system message. In other words, the handover parameter set is sent by the first information, and the first information may be the MSG4 or an MSGB in a random access process, or the RRC signaling, or the system message.

In a first sending mode, the handover parameter set is sent to the UE through the MSG4 or the MSGB in the random access process.

In a second sending mode, the handover parameter set is sent to the UE in the RRC reconfiguration message.

In a third sending mode, the handover parameter set is sent to the UE through broadcasting the system message. The handover parameter set through the sending mode only includes handover parameters applicable to the UEs in the target cell.

In other sending modes, the above sending modes may be combined. For example, the first sending mode is combined with the second sending mode. Part of handover parameters are configured first in a random access process, and another part of handover parameters are configured in RRC reconfiguration messages. For another example, the first sending mode is combined with the third sending mode. A part of handover parameters are configured first in a random access process, and the handover parameters applicable to the UEs in the target cell are sent to the UE through broadcasting one or more system messages. For another example, the second sending mode is combined with the third sending mode. A part of handover parameters are configured in RRC reconfiguration messages, and the handover parameters applicable to the UEs in the target cell are sent to the UE through broadcasting one or more system messages.

Sending handover parameters through an MSG4 or an MSGB in the random access process is described below.

The random access process refers to a process from a terminal starting to attempt to access a network by sending a random access preamble sequence to establishing a basic signaling connection with the network, which is configured to establish data communication between the terminal and the network. Most terminals currently adopt a contention-based random access process. The random access process includes a 4-step random access process and a 2-step random access process.

In the 4-step random access process, each step is a message (MSG), and the four steps in the standard are referred to as MSG1 to MSG 4. For example, the 4-step random access process includes the following steps 1 to 4. At step 1, the terminal sends the MSG1 to the access network device. The MSG1 includes a random access preamble sequence. The random access preamble sequence available for the contention-based random access and a physical random access channel (PRACH) resource for sending the random access preamble sequence are configured by the access network device, and a configuration result is notified to the terminal in the cell through the system message. At step 2, the access network device sends the MSG2 to the terminal. The MSG2 includes a random access response (RAR). The terminal determines whether the RAR is received by detecting whether the MSG 2 carries an identity of the preamble sequence sent by the terminal. The MSG2 may include the identity of the random access preamble sequence corresponding to the MSG1, an uplink transmission timing advance, an uplink resource allocated to the terminal, a temporary C-RNTI, and other parameters. At step 3, the terminal sends the MSG3 to the access network device. The terminal transmits the MSG3 in the uplink resource allocated in the MSG2 when correctly receiving the MSG2, to complete a first scheduling transmission. The MSG3 may include identity information of the terminal, for example, a C-RNTI identity or a temporary C-RNTI identity. At step 4, the access network device sends the MSG4 to the terminal. The access network device and the terminal complete a final contention resolution through the MSG4. The content of MSG 4 corresponds to the content of MSG3.

The 2-step random access process set may be obtained by combining the above described 4-step random access process. For example, the 2-step random access process includes the following steps 1 to 2. At step 1, the terminal sends the MSGA to the access network device, and the access network device receives the MSGA. The MSGA includes a random access preamble sequence and physical uplink shared channel (PUSCH) data. The PUSCH data may include identity information of the terminal, for example, a C-RNTI, etc. That is, the MSGA includes the contents of both the MSG1 and the MSG3. At step 2, the access network device sends the MSGB to the terminal, and the terminal receives the MSGB. The MSGB includes a RAR and contention resolution information. That is, MSGB includes the contents of both the MSG2 and the MSG4.

In some embodiments of the present disclosure, the handover parameters may be sent through the MSG4 or the MSGB in the random access process as described above. Even though the way for sending the handover parameter set in the random access process to the UE by using the MSG4 or the MSGB is described in the above embodiments, it is not limited in embodiments of the present disclosure. In order to send the handover parameters in the random access process, any message in an appropriate format may be adopted. The format of the message may be a format of a known type, for example, an improved type of message proposed based on the MSG4 or the MSGB, it may be other formats for establishing data communication between the terminal and the network in the random access process for future development.

Some sending modes of the handover parameter set according to the embodiments of the present disclosure are described below.

In some embodiments of the present disclosure, the handover parameter set is sent through an MSG4 or an MSGB in a random access process, in which the handover parameter set includes all handover parameters needed by handover.

In some embodiments of the present disclosure, the handover parameter set is sent through a reconfiguration message of a RRC signaling, in which the handover parameter set includes all the handover parameters needed by handover.

In some embodiments of the present disclosure, a first part of the handover parameter set needed by handover is sent through an MSG4 or an MSGB in a random access process, in which the first part of the handover parameter set includes one or more groups of handover parameters; and a second part of the handover parameter set needed by handover is sent through a reconfiguration message of an RRC signaling, in which the second part of the handover parameter set includes one or more groups of handover parameters.

In some embodiments of the present disclosure, a second part of the handover parameter set needed by handover is sent through an MSG4 or an MSGB in a random access process, in which the second part of the handover parameter set includes one or more groups of handover parameters; and a first part of the handover parameter set needed by handover is sent through a reconfiguration message of an RRC signaling, in which the first part of the handover parameter set includes one or more groups of handover parameters.

In some embodiments of the present disclosure, a second part of the handover parameter set needed by handover is sent through an MSG4 or an MSGB in the random access process, in which the second part of the handover parameter set includes one or more groups of handover parameters; and a first part of the handover parameter set needed by handover is sent through a system message, in which the first part of the handover parameter set includes one or more groups of handover parameters.

In some embodiments of the present disclosure, a second part of the handover parameter set needed by handover is sent through a reconfiguration message of an RRC signaling, in which the second part of the handover parameter set includes one or more groups of handover parameters; and a first part of the handover parameter set needed by handover is sent through a system message, in which the first part of the handover parameter set includes one or more groups of handover parameters.

In some embodiments of the present disclosure, a second part of the handover parameter set needed by handover is sent through an MSG4 or an MSGB in the random access process, in which the second part of the handover parameter set includes one or more groups of handover parameters; a first part of the handover parameter set needed by handover is sent through a system message, in which the first part of the handover parameter set includes one or more groups of handover parameters; and a handover indication of handover to the target cell is sent through a reconfiguration message of an RRC signaling.

In some embodiments of the present disclosure, all the handover parameters needed by handover are constituted by the first part of the handover parameter set and the second part of the handover parameter set. For example, the first part of the handover parameter set includes same handover parameters applicable to all terminals. For example, the second part of the handover parameter set includes specific handover parameters of the terminal in at least one target cell.

The sending modes of the handover parameter set according to the embodiments of the present disclosure described above are described in combination with specific examples.

In a first example, the network device sends at least one group of handover parameters to the UE through the MSG4 in the random access process. The at least one group of handover parameters only includes part of parameters needed by the UE, for example, the same handover parameters for all the UEs: spCellConfigCommon, T304. The network device sends at least one group of handover parameters to the UE through the RRC reconfiguration message that includes UE-specific handover parameters of the target cell to which the UE will hand over. For example, the UE-specific handover parameters may include the identity of the UE in the target cell.

In a second example, the network device sends at least one group of handover parameters to the UE through the system message. The handover parameters include part of parameters needed by the UE, for example, the same handover parameters for all the UEs, spCellConfigCommon, T304. The network device sends at least one group of handover parameters to the UE through the RRC reconfiguration message that includes UE-specific handover parameters of the target cell to which the UE is intended to hand over. For example, the UE-specific handover parameters may include the identity of the UE in the target cell.

In a third example, the network device sends at least one group of handover parameters to the UE through the MSG4 or the MSGB in the random access process, in which the at least one group of handover parameters includes all parameters needed by the UE.

In a fourth example, the RRC reconfiguration message sent to the UE includes at least one group of handover parameters, in which the handover parameters include all parameters needed by the UE.

In a fifth example, the network sends at least one group of handover parameters to the UE through the MSG4 or the MSGB in the random access process, in which the at least one group of handover parameters only includes the UE-specific handover parameters of the target cell, for example, the identity of the UE in the target cell; the system message includes at least one group of handover parameters, which is sent to the UE through the system message, and the at least one group of handover parameters only includes the same handover parameters for all the UEs, for example, SpCell-ConfigCommon, T304; and the RRC reconfiguration message sent to the UE only includes a handover indication that indicates the UE to hand over to the target cell.

A handling mode when there is a conflict among the handover parameters sent according to the embodiments of the present disclosure is described below.

In some embodiments of the present disclosure, when the first part of the handover parameter set and the second part of the handover parameter set include the same type of handover parameters, the same type of handover parameters sent by the reconfiguration message of the RRC signaling are configured for the handover.

In an embodiment, when the handover parameters sent to the UE through the RRC conflict with the handover parameters broadcast to the UE through the system message, the handover parameters sent to the UE through the RRC are configured for handover, that is, the UE is subject to the handover parameters sent by the RRC. That is, the handover parameters sent to the UE through the RRC can be considered as the first part of the handover parameter set. The handover parameters broadcast to the UE through the system message can be considered as the second part of the handover parameter set. For example, when the timer T304 corresponding to the target cell ID 1 configured by the RRC is 200 ms, the timer T304 corresponding to the target cell ID 2 configured by the RRC is 300 ms, the timer T304 corresponding to the target cell ID 1 configured by the system message is 100 ms, and the timer T304 corresponding to the target cell ID 2 configured by the system message is 200 ms, then the timer T304 configured by the RRC is configured for handover, that is, the UE uses the timer T304 configured by the RRC, i.e., the timer T304 corresponding to the target cell ID 1 is 200 ms, and the timer T 304 corresponding to the target cell ID 2 is 300 ms.

It needs to be noted that, those skilled in the art may understand that various implementations/embodiments involved in embodiments of the present disclosure may be used in combination with the above embodiments, and may be independently used. Whether independently used or used in combination with the above embodiments, the implementation principle is similar. In embodiments of the present disclosure, part of embodiments are illustrated by the implementations used together. It may be understood by those skilled in the art that the examples are not a limitation of embodiments of the present disclosure.

A method for processing handover parameters is provided in embodiments of the present disclosure, which is applied to a terminal. FIG. 3 is a flowchart illustrating a method for processing handover parameters according to an embodiment. As illustrated in FIG. 3, the method for processing the handover parameters is applied to the terminal, and includes the following step S310.

At S310, a handover parameter set is acquired. The handover parameter set at least includes at least one group of handover parameters, each group of handover parameters in the at least one group of handover parameters corresponding to one target cell of at least one target cell.

In embodiments of the present disclosure, since the handover parameters include at least one group of handover parameters, and each group of handover parameters in the at least one group of handover parameters corresponds to one target cell of at least one target cell, the handover parameters may be pre-configured to the UE. This avoids generation of a large number of handover commands in a short time and a large number of signaling overheads, and ensures the service continuity.

In some embodiments of the present disclosure, the handover parameter set includes handover parameters corresponding to all the target cells; or the handover parameter includes handover parameters corresponding to a part of the target cells. In the context of the present disclosure, for example, the target cell refers to a neighbor cell of a service cell of the UE, and all the neighbor cells may be the target cells of the UE.

A setting mode of handover parameters in the handover parameter set according to the embodiments of the present disclosure is described below.

In some embodiments of the present disclosure, at least one group of handover parameters in the handover parameter set includes location information configured to identify a target cell and handover parameters corresponding to the target cell; or, the at least one group of handover parameters in the handover parameter set includes identity information configured to identify a target cell and handover parameters corresponding to the target cell; or, each group of handover parameters in the handover parameter set includes type information configured to identify a target cell and handover parameters corresponding to the target cell.

In some embodiments of the present disclosure, the type information of the target cell is configured to indicate whether the target cell is a ground cell or a non-ground cell. In the present disclosure, for example, the ground cell refers to a cell based on the TN, and the non-ground cell may be a cell based on the NTN. For example, the non-ground cell may include a cell based on the LEO, a cell based on the MEO and a cell based on the GEO.

In some embodiments of the present disclosure, location information for identifying the target cell that matches the location information of the terminal in the handover parameter set and parameters corresponding to the target cell are determined based on location information of the terminal, and handover is performed by using the handover parameters corresponding to the target cell.

In some embodiments of the present disclosure, identity information for identifying the target cell that matches identity information of the target cell in the handover parameter set and parameters corresponding to the target cell are determined based on the identity information of the target cell, and handover is performed by using the handover parameters corresponding to the target cell.

In some embodiments of the present disclosure, identity information for identifying the target cell that matches a network type of the target cell in the handover parameter set and handover parameters corresponding to the target cell are determined based on the network type of target cell, and handover is performed by using the handover parameters corresponding to the target cell.

In an embodiment, the at least one group of handover parameters in the handover parameter set includes location information configured to identify a target cell and handover parameters corresponding to the target cell. For example, when the UE needs a handover, the UE determines and applies target handover parameters used by matching based on location information where the UE is located and location information sent by the network. In an embodiment, the UE receives at least one group of handover parameters configured by the network through the MSG4 in the random access process: location information 1, a handover parameter 1; location information 2, a handover parameter 2. The UE receives a handover command sent by the network and determines handover parameters of the target cell based on the location information of the UE. When the location of the UE is in the location information 2, the handover parameter 2 is applied.

In an embodiment, the at least one group of handover parameters in the handover parameter set includes identity information configured to identify the target cell and handover parameters corresponding to the target cell. For example, when the UE needs a handover, the UE determines handover parameters based on the ID of the target cell. In an embodiment, the UE receives at least one group of handover parameters broadcast by the system message: a cell ID 1, a handover parameter 1; a cell ID 2, a handover parameter 2. The UE receives a handover command sent by the network and determines handover parameters based on the ID of the target cell. When the ID of the target cell is ID 1, the handover parameter 1 is applied.

In an embodiment, each group of handover parameters in the handover parameter set includes type information configured to identify the target cell and handover parameters corresponding to the target cell. For example, when the UE needs a handover, the UE determines handover parameters based on the network type of the target cell. In an embodiment, the UE receives at least one group of handover parameters configured by the network through the MSG4 in the random access process: a network type 1, a handover parameter 1 (T304); a network type 2, a handover parameter 2 (T304). The UE receives at least one group of handover parameters broadcast by the system message: a cell ID 1, a handover parameter 1; a cell ID 2, a handover parameter 2. The handover parameter 1 and the handover parameter 2 do not include the timer T304. The UE receives an RRC reconfiguration message sent by the network. When the RRC reconfiguration message includes a UE-specific configuration for the UE handing over to the target cell, for example, a UE identity, the UE determines handover parameters for handing over to the target cell based on the type of the target cell and the ID of the target cell.

A receiving mode of the handover parameter set according to the embodiments of the present disclosure is described below.

In some embodiments of the present disclosure, the method for processing the handover parameters includes at least one of: receiving the handover parameter set through an MSG4 or an MSGB in the random access process; receiving the handover parameter set through a reconfiguration message of an RRC signaling; and receiving the handover parameter set through a system message.

In a first receiving mode, the UE receives the handover parameter set through an MSG4 or an MSGB in the random access process.

In a second receiving mode, the UE receives the handover parameter set in the RRC reconfiguration message.

In a third receiving mode, the UE receives the handover parameter set broadcast by the system message, in which the handover parameter set through the receiving mode only includes handover parameters applicable to the UEs in the target cell.

In other receiving modes, the above receiving modes may be combined with each other. For example, the first receiving mode is combined with the second receiving mode. A part of handover parameters are received first in the random access process, and another part of handover parameters are received in the RRC reconfiguration message. For another example, the first receiving mode is combined with the third receiving mode. A part of handover parameters are received first in the random access process, and the UE receives the sent handover parameters applicable to the UEs in the target cell in the system message. For another example, the second receiving mode is combined with the third sending mode. A part of handover parameters are received in the RRC reconfiguration message, and the UE receives the handover parameters applicable to the UEs in the target cell broadcast by the system message.

Some receiving modes of the handover parameter set according to the embodiments of the present disclosure are described below.

In some embodiments of the present disclosure, the handover parameter set is received through an MSG4 or an MSGB in a random access process, in which the handover parameter set includes all handover parameters needed by handover.

In some embodiments of the present disclosure, the handover parameter set is received through a reconfiguration message of an RRC signaling, in which the handover parameter set includes all the handover parameters needed by handover.

In some embodiments of the present disclosure, a first part of the handover parameter set needed by handover is received through an MSG4 or an MSGB in a random access process, in which the first part of the handover parameter set includes one or more groups of handover parameters; and a second part of the handover parameter set needed by handover is received through a reconfiguration message of an RRC signaling, in which the second part of the handover parameter set includes one or more groups of handover parameters.

In some embodiments of the present disclosure, a second part of the handover parameter set needed by handover is received through an MSG4 or an MSGB in a random access process, in which the second part of the handover parameter set includes one or more groups of handover parameters; and a first part of the handover parameter set needed by handover is received through a reconfiguration message of an RRC signaling, in which the first part of the handover parameter set includes one or more groups of handover parameters.

In some embodiments of the present disclosure, a second part of the handover parameter set needed by handover is received through an MSG4 or an MSGB in a random access process, in which the second part of the handover parameter set includes one or more groups of handover parameters; and a first part of the handover parameter set needed by handover broadcast by a system message is received, in which the first part of the handover parameter set includes one or more groups of handover parameters.

In some embodiments of the present disclosure, a second part of the handover parameter set needed by handover is received through a reconfiguration message of an RRC signaling, in which the second part of the handover parameter set includes one or more groups of handover parameters; and a first part of the handover parameter set needed by handover broadcast by the system message is received through a system message, in which the first part of the handover parameter set includes one or more groups of handover parameters.

In some embodiments of the present disclosure, a second part of the handover parameter set needed by handover is received through an MSG4 or an MSGB in the random access process, in which the second part of the handover parameter set includes one or more groups of handover parameters; a first part of the handover parameter set needed by handover broadcast by a system message is received, in which the first part of the handover parameter set includes one or more groups of handover parameters; and a handover indication of handover to the target cell is received through a reconfiguration message of an RRC signaling.

In some embodiments of the present disclosure, all the handover parameters needed by handover are constituted by the first part of the handover parameter set and the second part of the handover parameter set. For example, the first part of the handover parameter set includes same handover parameters applicable to all the terminals. For example, the second part of the handover parameter set includes specific handover parameters of the terminal in at least one target cell.

In some embodiments of the present disclosure, same type of handover parameters received by the reconfiguration message of the RRC signaling are configured for the handover when the first part of the handover parameter set and the second part of the handover parameter set include the same type of handover parameters.

In an embodiment, when the handover parameters received by the UE through the RRC conflict with the received handover parameters broadcast by the system message, the handover parameters received by the UE through the RRC are configured for handover, that is, the UE is subject to the handover parameters sent by the RRC. For example, when the timer T304 corresponding to the target cell ID 1 configured by the RRC is 200 ms, the timer T304 corresponding to the target cell ID 2 configured by the RRC is 300 ms, the timer T304 corresponding to the target cell ID 1 configured by the system message is 100 ms, and the timer T304 corresponding to the target cell ID 2 configured by the system message is 200 ms, then the timer T304 configured by the RRC is configured for handover, that is, the UE applies the timer T304 configured by the RRC, i.e., the timer T304 corresponding to the target cell ID 1 is 200 ms, and the timer T 304 corresponding to the target cell ID 2 is 300 ms.

It needs to be noted that, those skilled in the art may understand that various implementations/embodiments involved in embodiments of the present disclosure may be used in combination with the above embodiments, and may be independently used. Whether independently used or used in combination with the above embodiments, the implementation principle is similar. In embodiments of the present disclosure, a part of embodiments are illustrated by the implementations used together. It may be understood by those skilled in the art that the examples are not a limitation of embodiments of the present disclosure.

The apparatus embodiments of the present disclosure are as follows, which may be configured to implement the method embodiments of the present disclosure. For details not disclosed in the apparatus embodiments of the present disclosure, please refer to the method embodiments of the present disclosure.

Based on the same invention conception, an apparatus for processing handover parameters is provided in embodiments of the present disclosure, which is applied to a network device.

FIG. 4 is a block diagram illustrating an apparatus for processing handover parameters according to an embodiment. As illustrated in FIG. 4, an apparatus 400 for processing handover parameters is applied to the network device, and includes a parameter determining unit 410.

The parameter determining unit 410 is configured to determine a handover parameter set. The handover parameter set at least includes at least one group of handover parameters, each group of handover parameters in the at least one group of handover parameters corresponding to one target cell of at least one target cell.

In some embodiments of the present disclosure, the handover parameter set at least includes one group of handover parameters. In another embodiments of the present disclosure, the handover parameter set at least includes a plurality of groups of handover parameters. The plurality of groups of handover parameters refer to two or more than two handover parameters.

The apparatus embodiments of the present disclosure are as follows, which may be configured to implement the method embodiments of the present disclosure. For details not disclosed in the apparatus embodiments of the present disclosure, please refer to the method embodiments of the present disclosure.

Based on the same invention conception, an apparatus for processing handover parameters is provided in embodiments of the present disclosure, which is applied to a terminal.

Figure 5:
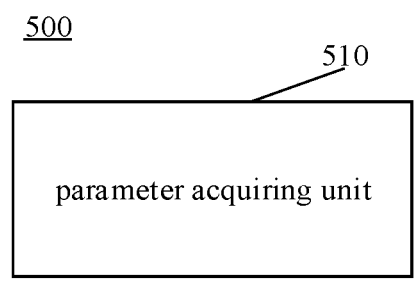
FIG. 5 is a block diagram illustrating a terminal apparatus for processing handover parameters according to an embodiment.

FIG. 5 is a block diagram illustrating an apparatus for processing handover parameters according to an embodiment. As illustrated in FIG. 5, an apparatus 500 for processing handover parameters is applied to the terminal, and includes a parameter acquiring unit 510.

The parameter acquiring unit 510 is configured to determine a handover parameter set. The handover parameter set at least includes at least one group of handover parameters, each group of handover parameters in the at least one group of handover parameters corresponding to one target cell of at least one target cell.

It may be understood that, the apparatus for processing the handover parameters provided in embodiments of the present disclosure contains hardware structures and/or software modules that execute various functions in order to implement the above functions. In combination with the units and algorithm steps of the examples described in embodiments of the present disclosure, the embodiments of the present disclosure may be implemented in the form of a hardware or a combination of a hardware and a computer software. Whether a certain function is executed by the hardware or the computer software driving the hardware depends on the specific application and design constraints of the technical solution. Those skilled in the art may adopt different methods for each specific application to implement the described functions, but such implementation should not be considered as beyond the scope of the technical solutions of embodiments of the present disclosure.

Figure 6:
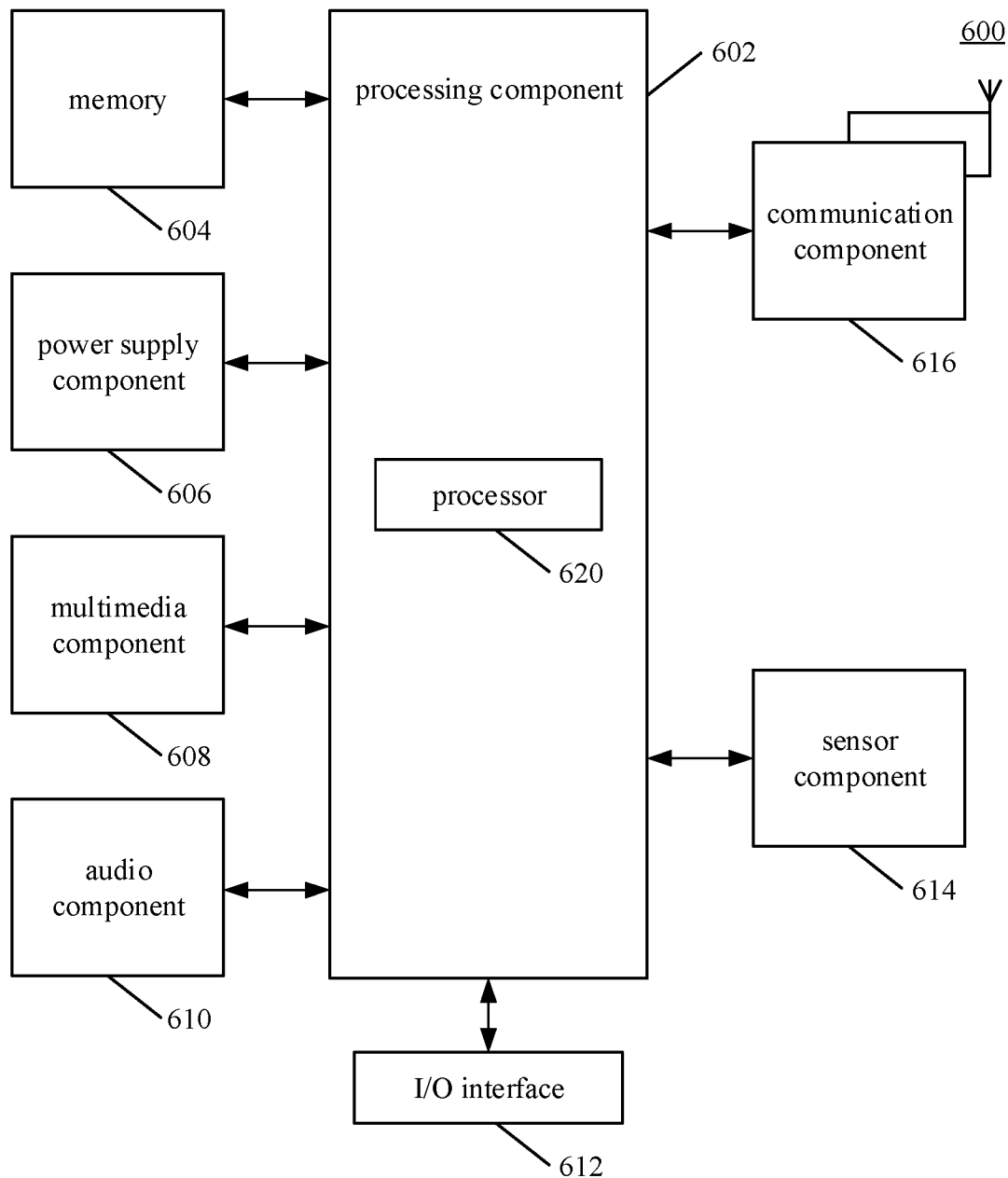
FIG. 6 is a block diagram illustrating a terminal device for processing handover parameters according to an embodiment.

FIG. 6 is a block diagram illustrating a device 600 for processing handover parameters according to an embodiment. For example, the device 600 may be a terminal. The terminal may be a mobile phone, a computer, a digital broadcasting terminal, a messaging device, a game console, a tablet device, a medical device, a fitness equipment, a personal digital assistant, etc.

Referring to FIG. 6, the device 600 may include one or more components: a processing component 602, a memory 604, a power supply component 606, a multimedia component 608, an audio component 610, an input/output (I/O) interface 612, a sensor component 614, and a communication component 616.

The processing component 602 generally controls the whole operations of the device 600, such as the operations related to display, phone call, data communication, camera operation and recording operation. The processing component 602 may include one or more processors 620 to perform instructions, to complete all or part of steps of the above method. In addition, the processing component 602 may include one or more modules for the convenience of interactions between the processing component 602 and other components. For example, the processing component 602 may include a multimedia module for the convenience of interactions between the multimedia component 608 and the processing component 602.

The memory 604 is configured to store all types of data to support the operations of the device 600. Examples of the data include the instructions of any applications or methods operated on the device 600, contact data, phone book data, messages, pictures, videos, etc. The memory 604 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 606 may provide power supply for all components of the device 600. The power supply component 606 may include power supply management system, one or more power supplies, and other units related to generating, managing and distributing power for the device 600.

The multimedia component 608 includes a screen providing an output interface between the device 600 and the user. In some embodiments, the screen may include a liquid crystal display (LCD) and a touch panel (TP). When the screen includes the touch panel, the screen may be implemented as the touch screen to receive input signals from the user. The touch panel includes one or more touch sensors to sense touch, slide and gestures on the touch panel. The touch sensor may not only sense the boundary of touch or slide actions, but also detect the duration and pressure related to the touch or slide actions. In some embodiments, the multimedia component 608 includes a front camera and/or a rear camera. When the device 600 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 610 is configured as output and/or input signal. For example, the audio component 610 includes a microphone (MIC). When the device 600 is in an operation mode, such as a call mode, a record mode, and a speech recognition mode, the microphone is configured to receive external audio signals. The audio signals received may be further stored in the memory 604 or sent via the communication component 616. In some embodiments, the audio component 610 further includes a speaker configured to output an audio signal.

The I/O interface 612 provides an interface for the processing component 602 and the peripheral interface module, and the peripheral interface module may be a keyboard, a click wheel, a button, etc. The buttons may include but not limited to a home button, a volume button, a start button and a lock button.

The sensor component 614 includes one or more sensors, configured to provide various aspects of state assessment for the device 600. For example, the sensor component 614 may detect the on/off state of the device 600 and the relative positioning of the component. For example, the component is a display and a keypad of the device 600. The sensor component 614 may further detect the location change of the device 600 or one component of the device 600, the presence or absence of contact between the user and the device 600, the orientation or acceleration/deceleration of the device 600, and the temperature change of the device 600. The sensor component 614 may include a proximity sensor, which is configured to detect the existence of the objects nearby without any physical contact. The sensor component 614 may further include a light sensor such as CMOS or CCD image sensor, which is configured to use in imaging applications. In some embodiments, the sensor component 614 may further include an acceleration transducer, a gyroscope sensor, a magnetic sensor, a pressure sensor or a temperature sensor.

The communication component 616 is configured for the convenience of wire or wireless communication between the device 600 and other devices. The device 600 may access wireless networks based on communication standard, such as Wi-Fi, 2G or 3G, or their combination. In an embodiment, the communication component 616 receives broadcast signals or broadcast-related information from an external broadcast management system via a broadcast channel. In an embodiment, the communication component 616 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth® (BT) technology and other technologies.

In an embodiment, the device 600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronics components, which is configured to perform the above method.

In an embodiment, a non-transitory computer readable storage medium is further provided which includes instructions, such as the memory 604 including instructions, wherein the instructions may be executed by the processor 620 of the device 600 to complete the above methods. For example, the non-transitory computer readable storage medium may be a ROM, a random access memory (RAM), a CD-ROM, a magnetic tape, a floppy disk, an optical data storage device, etc.

Figure 7:
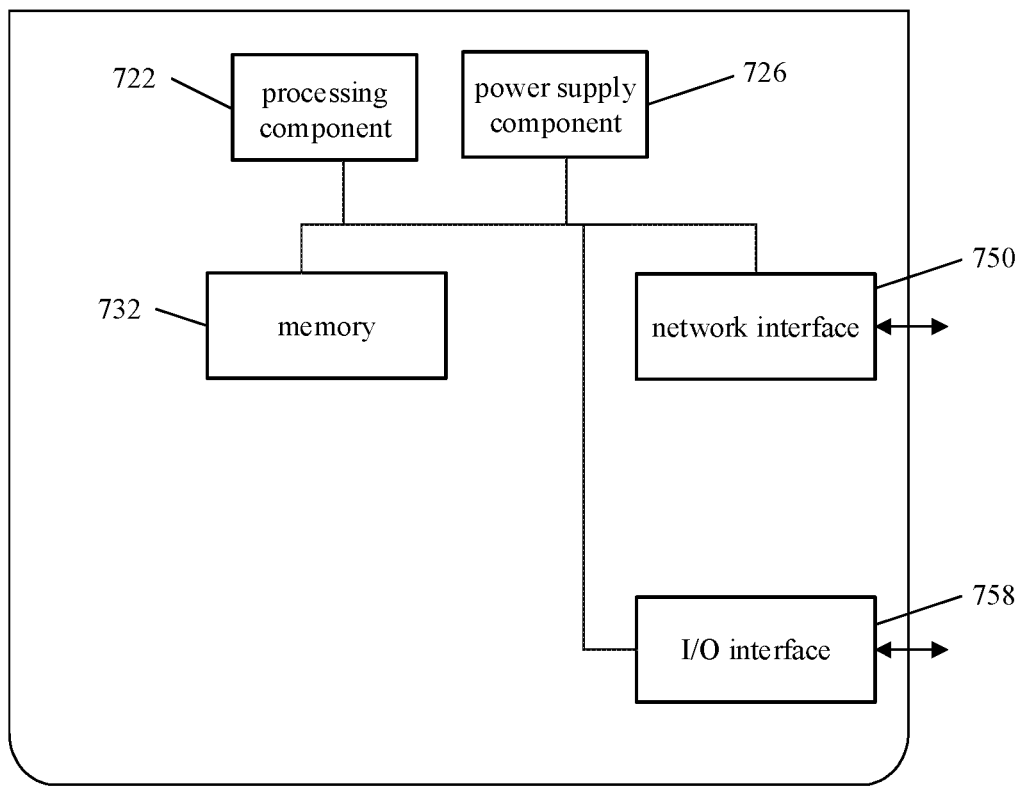
FIG. 7 is a block diagram illustrating a network device for processing handover parameters according to an embodiment.

FIG. 7 is a block diagram illustrating a device 700 for processing handover parameters according to an embodiment. The device 700 may be a network device. As illustrated in FIG. 7, the device 700 includes a processing component 722, which further includes one or more processors, and memory resources represented by a memory 732, which are configured to store instructions executed by the processing component 722, for example, an application. The application stored in the memory 732 may include one or more modules each of which corresponds to a set of instructions. In addition, the processing component 722 is configured to execute instructions, to perform the above method.

The device 700 may further include one power supply component 726, configured to execute power management of the device 700, and one wired or wireless network interface 750, configured to connect the device 700 to a network; and one input/output (I/O) interface 758. The device 700 may operate an operating system stored in the memory 732, for example, Windows Server™, Mac OS X™, Unix™, Linux™, FreeBSD™, etc.

In an embodiment, a non-transitory computer readable storage medium including instructions is further provided, for example, the memory 732 including instructions. The instructions may be executed by the processing component 722 of the device 700 to complete the above methods. For example, the non-transitory computer readable storage medium may be a ROM, a random access memory (RAM), a CD-ROM, a magnetic tape, a floppy disk, an optical data storage device, etc.

The handover parameters include at least one group of handover parameters, and each group of handover parameters in at least one group of handover parameters corresponds to one target cell of at least one target cell, so that the handover parameters may be preconfigured to the UE. This avoids generation of a large number of handover commands in a short time and a large number of signaling overheads, and ensures the service continuity.

It may be understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In a certain situation, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for processing handover parameters, performed by a network device, the method comprising:
    determining a handover parameter set, wherein the handover parameter set comprises at least one group of handover parameters, each group of handover parameters in the at least one group of handover parameters corresponding to one target cell of at least one target cell;
    sending first information for indicating the handover parameter set to a terminal; and
    sending a first part of the handover parameter set and a second part of the handover parameter set through different messages, wherein the first part of the handover parameter set comprises same handover parameters applicable to all terminals, and the second part of the handover parameter set comprises specific handover parameters of terminals in the at least one target cells.

2. The method of claim 1, wherein,
    the at least one group of handover parameters in the handover parameter set comprises location information of a target cell and handover parameters corresponding to the target cell;
    or,
    the at least one group of handover parameters in the handover parameter set comprises identity information of a target cell and handover parameters corresponding to the target cell;
    or,
    each group of handover parameters in the handover parameter set comprises type information of a target cell and handover parameters corresponding to the target cell.

3. The method of claim 2, the type information of the target cell is configured to indicate whether the target cell is a ground cell or a non-ground cell.

4. The method of claim 1, wherein sending the first information comprises at least one of:
    sending the handover parameter set through an MSG4 or an MSGB in a random access process;
    sending the handover parameter set through a reconfiguration message of a radio resource control (RRC) signaling; or, sending the handover parameter set through a system message.

5. The method of claim 1, wherein sending the first information comprises at least one of:
    sending the handover parameter set through an MSG4 or an MSGB in a random access process, the handover parameter set comprising all handover parameters needed by handover;
    sending the handover parameter set through a reconfiguration message of a radio resource control (RRC) signaling, the handover parameter set comprising all the handover parameters needed by handover;
    sending the first part of the handover parameter set needed by handover through an MSG4 or an MSGB in a random access process; and sending the second part of the handover parameter set needed by handover through a reconfiguration message of a radio resource control (RRC) signaling;
    sending the second part of the handover parameter set needed by handover through an MSG4 or an MSGB in a random access process; and sending the first part of the handover parameter set needed by handover through a reconfiguration message of a radio resource control (RRC) signaling;

sending the second part of the handover parameter set needed by handover through an MSG4 or an MSGB in a random access process; and sending the first part of the handover parameter set needed by handover through a system message;

sending the second part of the handover parameter set needed by handover through a reconfiguration message of a radio resource control (RRC) signaling; and sending the first part of the handover parameter set needed by handover through a system message; or, sending the second part of the handover parameter set needed by handover through an MSG4 or an MSGB in a random access process; sending the first part of the handover parameter set needed by handover through a system message; and sending a handover indication of handover to the target cell through a reconfiguration message of a radio resource control (RRC) signaling.

6. The method of claim 5, wherein,
all the handover parameters needed by handover comprise the first part of the handover parameter set and the second part of the handover parameter set.

7. The method of claim 5, wherein,
when the first part of the handover parameter set and the second part of the handover parameter set comprise one same type of handover parameters, the same type of handover parameters sent by the reconfiguration message of the RRC signaling are configured for the handover.

8. The method of claim 1, wherein the first information comprises at least one of:
the handover parameter set;
parameter values of the at least one group of handover parameters;
an identifier corresponding to the handover parameter set; or
one or more identifiers corresponding to the handover parameters in the handover parameter set.

9. A method for processing handover parameters, performed by a terminal, the method comprising:
acquiring a handover parameter set according to first information sent by a network device, wherein the handover parameter set comprises at least one group of handover parameters, each group of handover parameters in the at least one group of handover parameters corresponding to one target cell of at least one target cell; and
receiving a first part of the handover parameter set and a second part of the handover parameter set through different messages, wherein the first part of the handover parameter set comprises same handover parameters applicable to all terminals, and the second part of the handover parameter set comprises specific handover parameters of terminals in the at least one target cell.

10. The method of claim 9, wherein,
the at least one group of handover parameters in the handover parameter set comprises location information of a target cell and handover parameters corresponding to the target cell;

the at least one group of handover parameters in the handover parameter set comprises identity information of a target cell and handover parameters corresponding to the target cell; or,
each group of handover parameters in the handover parameter set comprises type information of a target cell and handover parameters corresponding to the target cell.

11. The method of claim 10, the type information of the target cell is configured to indicate whether the target cell is a ground cell or a non-ground cell.

12. The method of claim 9, wherein acquiring the handover parameter set comprises at least one of:
receiving the handover parameter set through an MSG4 or an MSGB in a random access process;
receiving the handover parameter set through a reconfiguration message of a radio resource control (RRC) signaling; or,
receiving the handover parameter set broadcast by a system message.

13. The method of claim 9, wherein acquiring the handover parameter set comprises at least one of:
receiving the handover parameter set through an MSG4 or an MSGB in a random access process, the handover parameter set comprising all handover parameters needed by handover;
receiving the handover parameter set through a reconfiguration message of a radio resource control (RRC) signaling, the handover parameter set comprising all the handover parameters needed by handover;
receiving the first part of the handover parameter set needed by handover through an MSG4 or an MSGB in a random access process; and receiving the second part of the handover parameter set needed by handover through a reconfiguration message of a radio resource control (RRC) signaling;
receiving the second part of the handover parameter set needed by handover through an MSG4 or an MSGB in a random access process; and receiving the first part of the handover parameter set needed by handover through a reconfiguration message of a radio resource control (RRC) signaling;
receiving the second part of the handover parameter set needed by handover through an MSG4 or an MSGB in a random access process; and receiving the first part of the handover parameter set needed by handover broadcast by a system message;
receiving the second part of the handover parameter set needed by handover through a reconfiguration message of a radio resource control (RRC) signaling; and receiving the first part of the handover parameter set needed by handover broadcast by a system message; or
receiving the second part of the handover parameter set needed by handover through an MSG4 or an MSGB in the random access process; receiving the first part of the handover parameter set needed by handover broadcast by a system message; and
receiving a handover indication of handover to the target cell through a reconfiguration message of a radio resource control (RRC) signaling.

14. The method of claim 13, wherein,
all the handover parameters needed by handover comprise the first part of the handover parameter set and the second part of the handover parameter set.

15. The method of claim 13, wherein,
when the first part of the handover parameter set and the second part of the handover parameter set comprise one same type of handover parameters, the same type of handover parameters received by the reconfiguration message of the RRC signaling are configured for the handover.

16. The method of claim 9, comprising at least one of:
determining location information of the target cell that matches location information of the terminal in the handover parameter set and handover parameters corresponding to the target cell, and performing handover by using the handover parameters corresponding to the target cell;
determining identity information of the target cell that matches the identity information of the target cell in the handover parameter set and handover parameters corresponding to the target cell, and performing handover by using the handover parameters corresponding to the target cell;
determining type information of the target cell that matches a network type of the target cell in the handover parameter set and handover parameters corresponding to the target cell, and performing handover by using the handover parameters corresponding to the target cell.

17. The method of claim 9, wherein the first information comprises at least one of:
the handover parameter set;
parameter values of the at least one group of handover parameters;
an identifier corresponding to the handover parameter set; or,
one or more identifiers corresponding to the handover parameters in the handover parameter set.

18. A terminal, comprising:
a processor; and
a memory configured to store instructions executable by the processor;
wherein, the processor is configured to: acquire a handover parameter set according to first information sent by a network device, wherein the handover parameter set comprises at least one group of handover parameters, each group of handover parameters in the at least one group of handover parameters corresponding to one target cell of at least one target cell; and
receive a first part of the handover parameter set and a second part of the handover parameter set through different messages, wherein the first part of the handover parameter set comprises same handover parameters applicable to all terminals, and the second part of the handover parameter set comprises specific handover parameters of terminals in the at least one target cell.

* * * * *